Oct. 13, 1953 M. SMOLENSKY 2,655,179
DOUBLE-ACTING LIQUID DISPENSING FIXTURE
Filed July 26, 1947 3 Sheets-Sheet 1
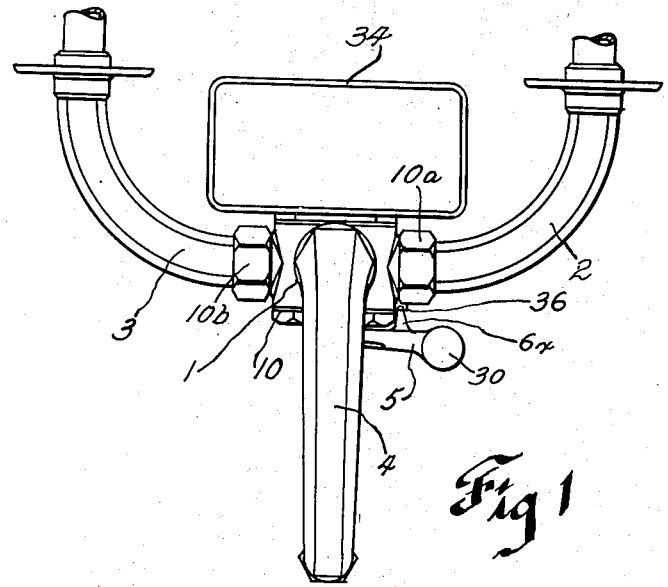
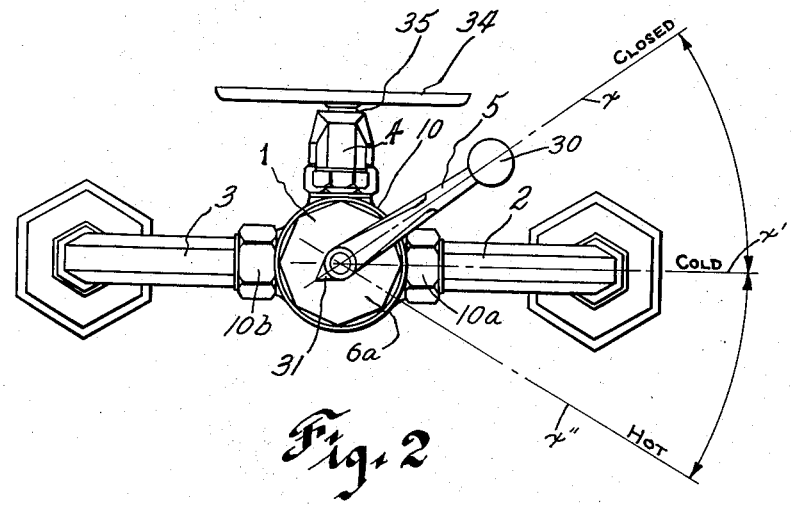
Michael Smolensky,
INVENTOR.
BY William J. Weisseler,
ATTORNEY.

Oct. 13, 1953 M. SMOLENSKY 2,655,179
DOUBLE-ACTING LIQUID DISPENSING FIXTURE
Filed July 26, 1947 3 Sheets-Sheet 2

Michael Smolensky
INVENTOR.
BY William J. Wesseler,
ATTORNEY.

Oct. 13, 1953 M. SMOLENSKY 2,655,179
DOUBLE-ACTING LIQUID DISPENSING FIXTURE
Filed July 26, 1947 3 Sheets-Sheet 3

Michael Smolensky,
INVENTOR.

BY William J. Coesseler,
ATTORNEY.

Patented Oct. 13, 1953

2,655,179

UNITED STATES PATENT OFFICE 2,655,179

DOUBLE-ACTING LIQUID DISPENSING FIXTURE

Michael Smolensky, Cleveland, Ohio

Application July 26, 1947, Serial No. 763,830

3 Claims. (Cl. 137—630.17)

This invention relates to a double acting liquid dispensing fixture. More particularly, it comprises a single fixture, having hot and cold water supplies, the outlet therefor being connected through to a pair of disk valves adapted to supply in selected proportions hot and cold water to a discharge nozzle or outlet, such as a swiveling delivery spout.

The principal object of said invention is to provide a fixture of this character having a double acting valve adapted to deliver hot and cold water in predetermined proportions to a spout.

Another object of the invention is to provide a valve structure with a central mixing chamber associated with a delivery spout and having valve members at each side thereof adapted to admit hot and cold water to such mixing chamber in predetermined proportions.

Another object of the invention is to provide a mixing chamber of simple construction, wherein the hot and cold water supplies are controlled by a pair of disk valves mounted on a common valve stem, operated by a single handle and adapted to supply hot and cold water to a swiveling spout in proportional amounts according to the angular position of such handle and valves.

Another object of the invention is to provide a sink fixture made of few parts and readily assembled and installed, and adapted to deliver proportional amounts of hot and cold water selectively to a swiveling spout.

Other and further objects of the invention will appear in the course of the following description.

To the accomplishment of the foregoing and related ends, said invention, then, consists of the means hereinafter fully described and particularly pointed out in the claims, the annexed drawings and the following description setting forth in detail certain mechanism embodying the invention, such disclosed means constituting, however, but several of various forms in which the principle of the invention may be used.

In said annexed drawings:

Fig. 1 is a top plan view of a fixture embodying the principles of the invention;

Fig. 2 is a front elevation of the structure shown in Fig. 1;

Figure 3:
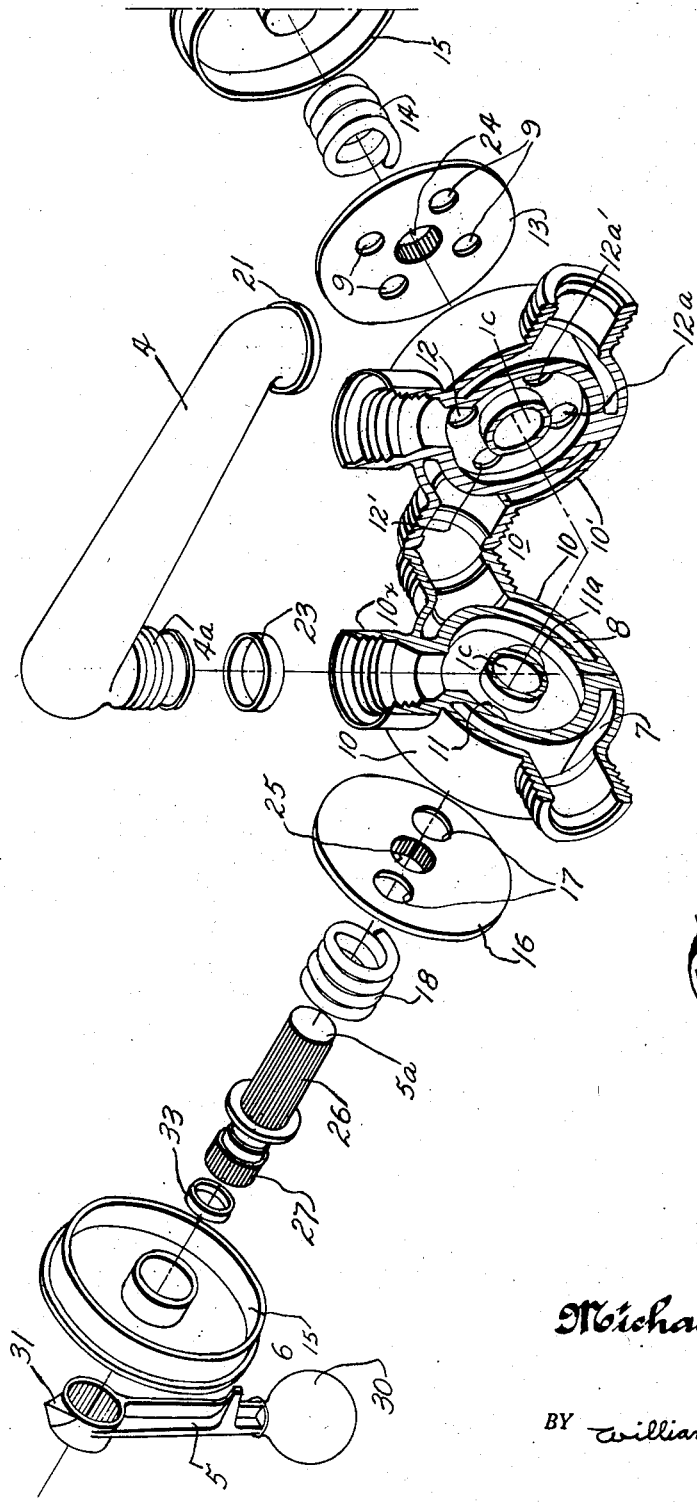
Fig. 3 is a perspective view, partly in section, showing the fixture and the valve disks and associated parts in separated expanded relation.
Figure 4:
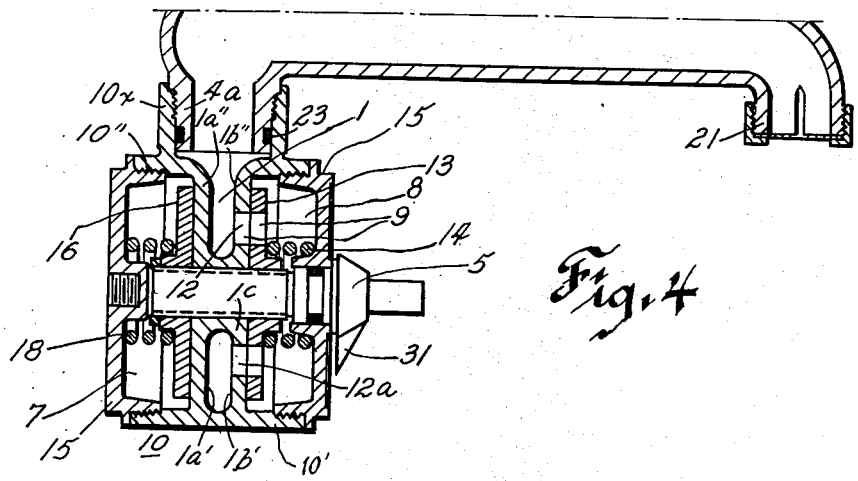
Fig. 4 is a central vertical sectional view of the central body portion of the fixture.
Figure 5:
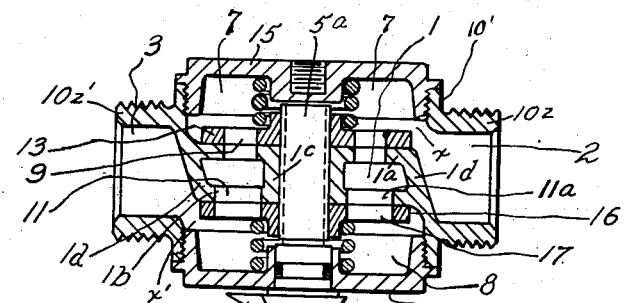
Fig. 5 is a central horizontal sectional view of the mixing chamber showing the water supply chambers and the valve disks.

As shown in Figs. 1 and 2, the fixture comprises a body portion 10 having therein a central mixing chamber 1 (later referred to), connected through a coupling 10a with a cold water supply line 2 at one side and through a coupling 10b with a hot water supply line 3 at the other side, as later set forth, and having a swiveling spout 4 mounted on the top surface of the body portion 10 and a valve control handle 5 projecting from the forward face of the body portion 10. The body portion 10 consists of an annular wall 10′ the inner walls of which adjacent the side edges thereof are provided with screw threads 10″ engaged by the screw threaded side walls of caps 15 to provide flow chambers 7, 8, as later set forth. The upper side of the wall 10′ is extended to provide an outlet nipple 10x to which is rotatably connected the inlet end 4a of the spout 4. The wall 10′ at diametric sides is expanded to provide nipples 10z, 10z′, the nipple 10z being connected through a coupling 10a with the cold water supply 2 and the nipple 10z′ being connected through the coupling 10b with the hot water supply 3. The mixing chamber 1 consists of spaced transverse walls 1a, 1b, integrally connected to the walls of an annulus 1c disposed axially of the annular wall 10′ and side walls 1d. The annulus 1c provides a bearing through which the stem 5a of the valve rotatably extends. The transverse walls 1a, 1b, are integrally connected at their lower portions 1a′, 1b′, to the adjacent portion of the annular wall 10′, whereas upper portions 1a″, 1b″, of the walls 1a, 1b, extend laterally and are integrally connected with the annular wall 10′ at opposite sides of the nipple 10x, thereby providing an outlet passage leading from the mixing chamber 1 directly to the nipple 10x. Intermediate the wall portions 1a′—1b′ and wall portions 1a″—1b″, the mixing chamber 1 are provided with the outer side walls 1d integrally related to the walls 1a, 1a, above and below the annulus 1c. As shown in Fig. 5, one side wall 1d is extended laterally and integrally connected to the annular wall 10′ along the inner side of the nipple 10z, to provide a flow connection x between the nipple 10z and flow chamber 7, whereas the other side wall 1d is extended laterally and integrally connected to the annular wall 10′ along the inner side of the nipple 10z′ to provide a flow connection x′ between the nipple 10z′ and the flow chamber 8. The transverse wall 1b is formed with a pair of diametrically related ports 11, 11a, their axes preferably being disposed at right angles to the axes of the nipples 10z, 10z′, whereas the wall 1a is formed with two pairs of diametrically related ports 12—12a, 12'—12a', the ports 12, 12', and ports 12a, 12a', being disposed on radii of the axis of the stem 5a at opposite sides of and angularly spaced from the ports 11, 11a, respectively. By preference, the ports 12, 12a', are disposed below and above the ports 11, 11a, respectively, and their axes are spaced from the axes thereof at an angle of 35 degrees, respectively, whereas the ports 12', 12a', are disposed above and below the ports 11, 11a, respectively, and their axes are spaced from the axes thereof at an angle of 30 degrees.

13, 16, indicate valve disks, suitably keyed to the valve stem 5a in face-to-face relation to the opposite outer sides of the walls 1a, 1b, respectively, and adapted to be rotatively operated by the valve stem 5a. The disk 13 is formed with four uniformly spaced apertures 9, each adapted to be moved into partial or full registry with one of the apertures 12—12a, 12'—12a', formed in the wall 1a, whereas the disk 16 is formed with two diametrically related apertures 17, each adapted to be moved into partial or full registry with one of the ports 11, 11a. A compression spring 14 is interposed between the disk 13 and the adjacent cap 15 and a compression spring 18 is interposed between the disk 16 and the adjacent cap 15. The springs 14, 18, serve to normally apply pressure against the disks 13, 16, when the parts are assembled in operative relation to provide sealing engagement thereof with the walls 1a, 1b, respectively. The opposite ends of each compression spring are seated around collars provided on the opposed faces of each valve disk and cap 15.

As will be observed, the cold water flows through nipple 10z, passage x to flow chamber 7 for supply through apertures 9 and ports 12—12a, 12'—12a', into the mixing chamber 1 and hot water flows through nipple 10z', passage x' to flow chamber 8 for supply through apertures 17 and ports 11, 11a, into the mixing chamber 1, whereby selected proportions of cold and hot water may be supplied for mixing in the chamber 1 for discharge from the spout 4.

The swiveling spout 4 has a downwardly turned outer end portion 21 for discharging the liquid supplied to the spout. The downwardly extending inner end 4a of the spout 4 is screw threaded to engage the screw threaded portion on the inner wall of the nipple 10x provided at the top of the body portion 10 and communicating with the central mixing chamber 1, as heretofore described. A compressible sealing member 23 is adapted to be seated between the downwardly turned end 4a of the spout and the nipple 10x to prevent leakage of liquid therefrom as the spout is turned to various positions of adjustment. It will be observed that the walls 1a, 1b, serve as valve seats and the disks 13, 16, serve as valve elements to control the flow of hot and/or cold water to the mixing chamber. In this arrangement, the use of washers of any kind and stuffing boxes are eliminated and as the disks 13, 16, are in face-to-face engagement with the walls 1a, 1b, under pressure, the rotative movement of the disks provides a grinding action between their engaged faces to insure efficient control of the water to the spout 4 and prevent leakage when flow of water to the spout is entirely cut off.

It will be noted that the valve disks 13 and 16 have central apertures 24, 25, respectively, which are grooved so as to interlockingly engage upon fluted or ribbed portions 26, 27, respectively, formed on a valve shaft or stem 5a, which is rotatably supported in the annulus 1c for movement by the handle 5 to various positions of angular adjustment. The handle 5, as shown more particularly in Fig. 2, is provided at its outer end with a ball 30 and with a conical pointer 31 at its inner end revoluble relative to the outer face of the adjacent cap 15, so that by means of suitable graduations (not shown) on the latter the adjustment of the valve disks 13 and 16 will be indicated.

The fixture may be provided in an elevated position with a rectangular soap dish 34, supported upon a suitable upstanding arm or bracket 35, connected with the rearward portion of the body member 10.

It will be noted that the ports or apertures 17 on the hot water side of the mixing chamber are larger than the cold water ports 9, and are positioned at an angle of 45 degrees to the position of the apertures or ports 9 on the cold water side of the mixing chamber, and this angular difference and difference in size permits the valve disks 13 and 16 to be set at suitable angles to each other so as to provide for an increased flow of hot water as the handle 5 is moved in a clockwise direction and for an increase in the cold water supply as the handle 5 is moved in a counter-clockwise direction. Movement of the handle 5 to the position x (Fig. 2) will completely shut off the water from the hot and cold water supplies, and the turning of the valve control handle 5 to a horizontal position x' in alignment with the cold water supply line will cause the entire water supply to be cold water and the turning of the handle downwardly to an angle of 45 degrees, as indicated at x'', will cause the water supply to be wholly from the hot water supply line. Any intermediate positions will provide proportionate mixtures of hot and cold water, so that any desired temperature of the water delivered through the spout may be had by setting the valve control handle at the appropriate angle for the temperature required. To set a shut-off limit to the movement of the handle, an upstanding lug 6x on the handle will contact with a stop lug 36 on the body. A sealing device 33 may be used on the stem 5a to prevent leakage near the handle 5.

Other modes of applying the principle of my invention may be employed instead of those explained, change being made as regards the mechanism herein disclosed, provided the means stated by any of the following claims or the equivalent of such stated means be employed.

I therefore particularly point out and distinctly claim as my invention:

1. A valve discharge structure having an annular wall open at its opposite ends and provided with diametrically related inlet nipples adapted to be connected with separate liquid supply connections and an outlet nipple disposed between said inlet nipples and adapted to be connected with a spout, spaced transverse walls within said annular wall, those portions of said transverse walls remote from said outlet nipple being integral with said annular wall and closed thereby and those portions of said transverse walls adjacent to said outlet nipple being integral with said annular wall at opposite sides of said outlet nipple to form an opening leading to the latter, an annulus disposed axially of said annular wall and extending through said transverse walls and integral therewith, a valve having a valve stem rotatably mounted in said annulus, peripheral side walls intermediate those portions of said transverse walls first referred to, respectively, integral with and connecting said transverse walls together, said spaced transverse walls, said annulus and said peripheral side walls forming between them an annular mixing chamber, removable closure devices for the opposite open ends of said annular wall and forming therewithin between said devices and said transverse walls flow chambers at opposite sides of said mixing chamber, said peripheral wall adjacent one of said inlet nipples being extended laterally in one direction and integrally connected to the adjacent side portion of said inlet nipple to prevent liquid flow from the latter to the adjacent flow chamber and permit liquid flow from said inlet nipple to the remote flow chamber and said peripheral side wall adjacent to said other inlet nipple being extended laterally in the opposite direction and integrally connected to the adjacent side portion of said other inlet nipple to prevent liquid flow from the latter to said remote flow chamber and permit liquid flow from said other inlet nipple to said first mentioned flow chamber, said transverse walls outwardly of said annulus providing valve seats each formed with spacedly related ports, valve elements consisting of disks connected to said valve stem for rotation thereby, said valve elements having face-to-face relation with the outer sides of said valve seats, respectively, and each formed with ports adapted to register with the ports formed in the adjacent valve seat when said valve stem is rotated to predetermined positions.

2. A structure as claimed in claim 1 wherein one of said valve seats is formed with a pair of diametrically related ports and the adjacent valve element is formed with a pair of apertures each adapted to register with one of said ports and the other valve seat is formed with two pairs of diametrically related ports, each pair of ports being disposed in offset angular relation to the other pair of ports and the valve element adjacent to the last mentioned valve seat being formed with two pairs of diametrically related apertures, each pair of apertures being disposed in offset angular relation to the other pair of apertures, each aperture being adapted to register with one of the last mentioned ports.

3. A structure as claimed in claim 2 wherein each port in the first mentioned valve element and each aperture in the adjacent valve seat are larger in diameter than each port in the last mentioned valve element and each port in the adjacent valve seat.

MICHAEL SMOLENSKY.

References Cited in the file of this patent

UNITED STATES PATENTS

| Number | Name | Date |
|---|---|---|
| 1,231,609 | Holzhausen | July 3, 1917 |
| 1,840,961 | Kunezler | Jan. 12, 1932 |
| 2,079,743 | Krieger | May 11, 1937 |
| 2,389,599 | Delany | Nov. 27, 1945 |